US006646968B1

(12) United States Patent
Miyaoka (10) Patent No.: US 6,646,968 B1
(45) Date of Patent: Nov. 11, 2003

(54) MAGNETO-OPTICAL RECORDING APPARATUS AND METHOD INCLUDING METHOD FOR PRESETTING OPTIMUM RECORDING POWER OF RECORDING APPARATUS

(75) Inventor: Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 09/606,019

(22) Filed: Jun. 29, 2000

(30) Foreign Application Priority Data

Jul. 2, 1999 (JP) .......................................... 11-189310

(51) Int. Cl.[7] .............................................. G11B 3/90
(52) U.S. Cl. ................................ 369/53.31; 369/13.05
(58) Field of Search .......................... 369/47.53, 53.36, 369/116, 53.31, 13.05

(56) References Cited

U.S. PATENT DOCUMENTS

| 5,091,897 | A | | 2/1992 | Otokawa et al. ............... 369/13 |
| 5,233,578 | A | | 8/1993 | Yamamoto et al. ............. 369/13 |
| 5,398,227 | A | | 3/1995 | Miyaoka et al. .............. 369/116 |
| 5,475,666 | A | * | 12/1995 | Ito et al. .................. 369/116 X |
| 5,485,433 | A | * | 1/1996 | Satomura et al. ........ 369/53.36 X |
| 5,732,061 | A | * | 3/1998 | Kirino et al. ................ 369/116 |
| 5,815,477 | A | * | 9/1998 | Kimura et al. .......... 369/116 X |
| 5,872,763 | A | * | 2/1999 | Osakabe ..................... 369/116 |
| 5,953,289 | A | | 9/1999 | Miyaoka ....................... 369/13 |
| 6,027,825 | A | | 2/2000 | Shiratori et al. ............. 428/694 |
| 6,058,077 | A | | 5/2000 | Miyaoka ....................... 369/13 |
| 6,069,852 | A | | 5/2000 | Miyaoka et al. ............... 369/13 |
| 6,101,154 | A | * | 8/2000 | Kim ........................ 369/116 X |
| 6,310,846 | B1 | * | 10/2001 | Fuji ........................ 369/53.31 |

FOREIGN PATENT DOCUMENTS

| JP | 6-290496 | 10/1994 |
| JP | 10-134354 | 5/1998 |

* cited by examiner

Primary Examiner—Aristotelis M. Psitos
(74) Attorney, Agent, or Firm—Fitzpatrick, Cella, Harper & Scinto (57) ABSTRACT

Disclosed herein is a testing process for recording for presetting optimum recording power for a domain wall displacement type magneto-optical medium, the process comprising the steps of:

recording a first record pattern on an Nth track on the magneto-optical medium;

separately recording a second record pattern on an (N−1)th track and an (N+1)th track adjacent to both sides of the Nth track with varied recording power;

reproducing the Nth track to detect a change in the pulse width of a reproduction signal;

detecting recording power, at which cross writing occurs, on the basis of the detected result; and presetting optimum recording power on the basis of the recording power at which cross writing occurs.

9 Claims, 10 Drawing Sheets

ERASING POWER IN (N±1)th TRACK ⟶

FIG. 7

RECORDING POWER ON (N±1)th TRACK (2T AND 8T) ⟶

MAGNETO-OPTICAL RECORDING APPARATUS AND METHOD INCLUDING METHOD FOR PRESETTING OPTIMUM RECORDING POWER OF RECORDING APPARATUS

BACKGROUND OF THE INVENTION

1. Field of the Invention

The present invention relates to a testing process for magneto-optical recording for presetting optimum recording power in magneto-optical medium of the domain wall displacement type, and to a magneto-optical recording-reproducing apparatus.

2. Related Background Art

In magneto-optical media, a multi-layer film comprising a magneto-optical layer and a reflection film has heretofore been formed on a transparent substrate through an insulating film. In general, land (or surface) portions and groove portions are used as data recording regions for storing information, and guiding grooves are used for tracking of a light beam, respectively, in magneto-optical recording. Magneto-optical medium capable of conducting high-density recording have been required with the increase in the quantity of information processing in recent years, and the idea to narrow a track pitch to meet such a requirement quickly has been forwarded. Research at a track pitch of 0.7 to 0.9 μm in a land (groove) type medium has been forwarded, and research to obtain a more narrow track pitch by shortening a laser wavelength has been advanced.

With the requirement of high-density recording, magneto-optical medium of the so-called land & groove type, in which grooves are formed as grooves sufficiently wide in width to write information not only into land portions; but also into groove portions, have also been developed. In the case of the land & groove type magneto-optical media, a pitch between land portions or between grooves can be made wider compared with the land (groove) type media, and so the restriction of a servo system for a light beam can be relaxed to form tracks as narrow as 6.4 to 0.7 μm, in terms of a track pitch.

As described above, information is recorded into the groove and land portions in a land & groove recording, and borders between land portions and groove portions are only slope portions of a substrate in which the land portions and groove portions have been formed, searches of formation of deep grooves, and the like are also collectively forwarded to provide longer slope portions.

On the other hand, in order to prevent destruction of data recorded on adjacent tracks, it is necessary to adjust power of a light beam in recording with high accuracy so as to form separately recorded domains of optimum sizes within land portions and groove portions constituting respective tracks. If the recording power is too high, in the case of a land recording, cross writing that a domain stored in the land portion extends beyond a groove to an adjacent land portion so as to destroy information recorded on the adjacent track occurs. In the case of a land & groove recording, cross writing that a domain stored in the land portion (or groove portion) extends beyond a slope portion of a border to an adjacent groove portion (or land portion) so as to destroy information recorded on the adjacent track occurs.

On the other hand, since magneto-optical recording is heat mode recording, the size of a magnetic domain recorded varies due to the influence of the temperatures of a recording apparatus and a medium used even when recording is conducted under the same recording conditions. Therefore, it is necessary to conduct recording while feeding back the influence of the temperatures of the recording apparatus and the medium into the recording conditions. In addition, individual differences between recording apparatuses due to differences in the form of a light spot caused by aberration of an optical head and defocusing, differences in characteristics between laser light sources, and the like, or scattering of the production of recording media, or the like, also greatly affects recording conditions.

As a method for preventing such cross writing, for example, Japanese Patent Application Laid-Open No.10-134354 has proposed a method for determining an optimum quantity of light for recording. According to this publication, a test pattern A is first recorded on an Nth track in a predetermined quantity of light for recording, and test patterns B are separately recorded on an (N+1)th track and an (N−1)th track in such various quantities of light for recording that a part of the test pattern A is sandwiched between them. Among data recorded on the Nth track, a difference between a reproduction signal from the portion of the test pattern A sandwiched between the test patterns B and a reproduction signal from the portion of the test pattern A not sandwiched between the test patterns B is determined every quantity of light for recording of the test patterns B to define the maximum quantity of light for recording from among the quantity of light for recording the test patterns B, in which the difference between the reproduction signal from the portion of the test pattern A sandwiched between the test patterns B and the reproduction signal from the portion of the test pattern A not sandwiched between the test patterns B falls within a prescribed range, as an optimum quantity of light for recording. Here, as a method for determining the difference between the reproduction signals, there is adopted a method in which a difference between the amplitude of the reproduction signal from the portion of the test pattern A sandwiched between the test patterns B and the amplitude of the reproduction signal from the portion of the test pattern A not sandwiched between the test patterns B, or a difference between standard deviation values of the respective signal levels or between error rates of reproduction is determined.

The linear recording density of an optical disk such as a magneto-optical medium greatly depends on the laser wavelength and the numerical aperture of an objective lens of an optical system for reproduction. More specifically, since the laser wavelength $\lambda$ and the numerical aperture NA of the objective lens of the optical system for reproduction determine the diameter of a beam waist, the detectable range of the spatial frequency upon reproduction of magnetic domains recorded is limited to about $2NA/\lambda$. Therefore, in order to achieve higher recording density with a conventional recording medium, it is necessary to shorten the laser wavelength $\lambda$ or enlarge the numerical aperture NA of the objective lens in the optical system for reproduction. However, improvements in the laser wavelength $\lambda$ and the numerical aperture NA of the objective lens are limited naturally. Therefore, techniques in which the structure and reading method of a recording medium are devised to improve the recording density have been developed.

For example, in Japanese Patent Application Laid-Open No. 6-290496, the present applicants have proposed a signal-reproducing method, in which signals are recorded in a memory layer of a multi-layer film having a displacement layer and the memory layer magnetically connected to each other, and recorded domains of less than the diffraction limit of an optical system are reproduced by displacing domain walls of the recorded domains in the displacement layer without changing record data in the memory layer by utilizing a temperature gradient caused by irradiation of a light beam for heating, and detecting a change in the polarization direction of reflected light of the light beam. According to this method, recorded domains of frequency of less than the diffraction limit of the optical system can be reproduced without decreasing the amplitude of reproduction signals, whereby recording density and transfer speed can be greatly improved. Such a magneto-optical medium will hereinafter be referred to as a domain wall displacement type magneto-optical medium.

Even when such a domain wall displacement type magneto-optical medium is used, research in which a track pitch is narrowed, thereby enhancing a track density in the magneto-optical medium, like the conventional magneto-optical medium, has been forwarded. In this case as well, the problem of cross writing due to formation of narrow tracks, like the conventional magneto-optical medium, or formation of narrow tracks by land & groove recording arises, and so there is the need of presetting recording power or providing an index to recording power in order to prevent cross writing.

Figure 11:
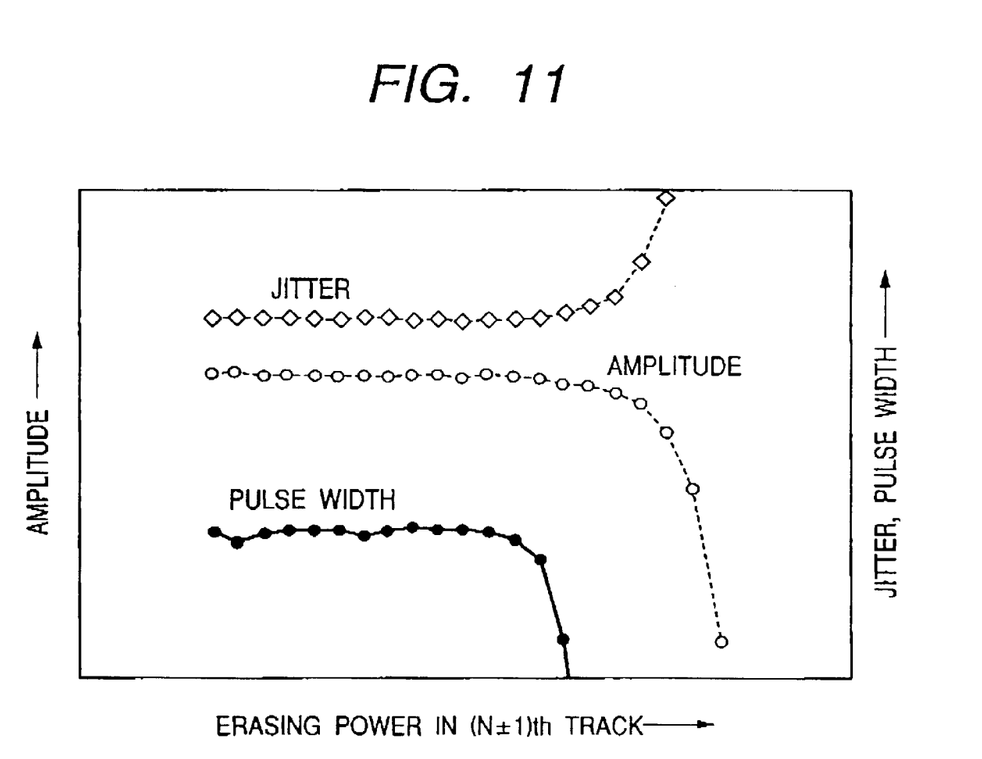
FIG. 11 illustrates the measured results in the case where cross writing of a domain wall displacement type magneto-optical medium was detected using a conventional method.

When it is attempted to detect cross writing by the conventional method described in Japanese Patent Application Laid-Open No. 10-134354 or the like, in the case where this domain wall displacement type magneto-optical medium is used, however, a change in the amplitude of reproduction signals has scarcely manifested itself at the point of time the cross writing occurs, and so the optimum recording power cannot be preset. FIG. 11 illustrates the results in the case where cross writing of a domain wall displacement type magneto-optical medium was detected by using the conventional method. An axis of abscissa indicates recording power of adjacent tracks {(N±1)th tracks}, and an axis of ordinate the amplitude, jitter and pulse width of a reproduction signal of an Nth track. As is apparent from FIG. 11, no change in the amplitude of the reproduction signal manifests itself at the point of time the cross writing occurs. The reason for this is that the reproduction principle of the domain wall displacement type magneto-optical medium comprises reproducing a magnetic domain recorded in a displacement layer by momentarily displacing a domain wall of the magnetic domain so that the waveform of the reproduction signal becomes a rectangular reproduction signal, and thus a delicate change in the width of the magnetic domain by cross writing scarcely manifests itself on the level and amplitude of the reproduction signal, unlike the reproduction signals of the conventional magneto-optical media.

In the case where the error rates of reproduction are used to detect the occurrence of cross writing, the error rate of a reproduction signal is generally designed with some allowance for the jitter of the reproduction signal itself in a magneto-optical recording-reproducing apparatus, and so little deterioration of the jitter is not directly reflected on the error rate of reproduction. However, the degree of allowance in the detection system of the apparatus for this jitter varies from apparatus to apparatus, because there are individual differences between jitters of respective reproduction signal-processing systems themselves.

In addition, since the jitter of a reproduction signal-processing system of an apparatus varies with environmental conditions upon reproduction, such as environmental temperature, and individual differences in laser power for reproduction, focus-tracking conditions and the like between different apparatuses affect the signal to noise ratio (S/N) of reproduction signals, and the degree of allowance in the detection system of the apparatus for jitters of magneto-optical reproduction signals varies from apparatus to apparatus. Accordingly, even when no change in error rate by cross writing is recognized in an apparatus, an error rate may be deteriorated in some cases when adjacent tracks to a track recorded in this apparatus are reproduced in another apparatus, so that the cross writing has been unable to be exactly detected. As described above, the application of the conventional presetting method of the optimum recording power for preventing cross writing to the domain wall displacement type magneto-optical medium has involved a problem that recording power at which cross writing occurs cannot be exactly detected for the above-described reasons.

SUMMARY OF THE INVENTION

In view of the above-described problems involved in the prior art, it is an object of the present invention to provide a testing process for magneto-optical recording for presetting optimum recording power applicable to domain wall displacement type magneto-optical media, and a magneto-optical recording-reproducing apparatus therefor.

The above object can be achieved by the present invention described below.

According to the present invention, there is thus provided a testing process for recording for presetting an optimum recording power for a domain wall displacement type magneto-optical medium, the process comprising the steps of:

recording a first record pattern on an Nth track on the magneto-optical medium;

separately recording a second record pattern on an (N−1)th track and an (N+1)th track adjacent to both sides of the Nth track with varied recording power;

reproducing a signal on the Nth track so as to detect a change in the pulse width of a reproduction signal;

detecting a recording power, at which cross writing occurs, on the basis of the detected result; and presetting the optimum recording power on the basis of the recording power at which cross writing occurs.

According to the present invention, there is also provided a magneto-optical recording-reproducing apparatus for recording information on a domain wall displacement type magneto-optical medium, the apparatus comprising:

a light source for emitting a light beam;

a circuit for recording a first record pattern on an Nth track on the medium and separately recording a second record pattern on an (N−1)th track and an (N+1)th track adjacent to both sides of the Nth track with varied recording power while controlling the light source;

a reproduction circuit for detecting the first record pattern by means of the light beam so as to output a reproduction signal;

a circuit for detecting a change in the pulse width of the reproduction signal; and a circuit for detecting recording power, at which cross writing occurs, on the basis of the detected result and presetting an optimum recording power on the basis of the recording power detected.

DESCRIPTION OF THE PREFERRED EMBODIMENTS

Figure 1:
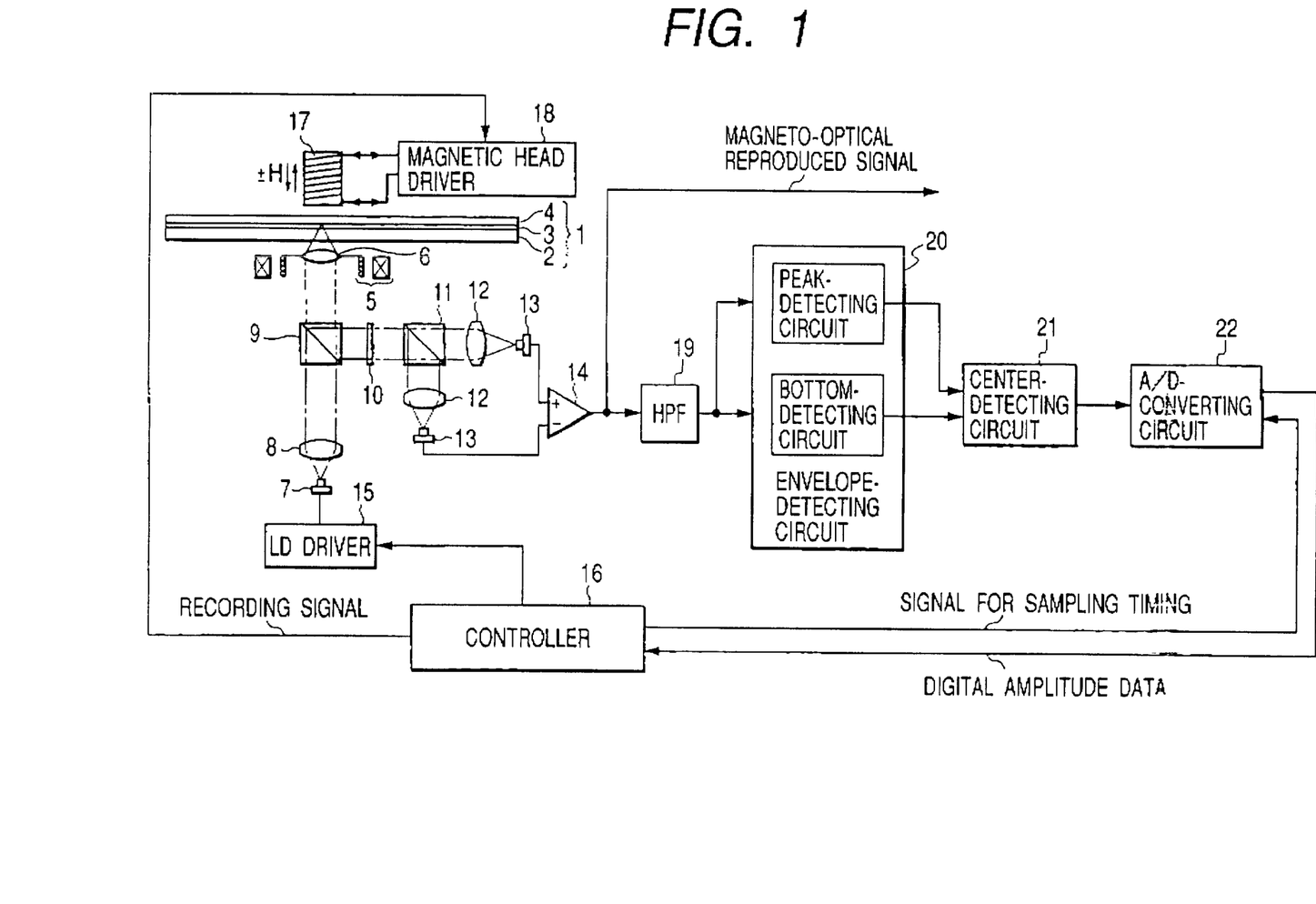
FIG. 1 is a block diagram illustrating a magneto-optical recording-reproducing apparatus according to a first embodiment of the present invention.

The embodiments of the present invention will hereinafter be described in detail with reference to the accompanying drawings. FIG. 1 is a block diagram illustrating the construction of a magneto-optical recording-reproducing apparatus according to a first embodiment of the present invention. In FIG. 1, reference numeral 1 denotes a magneto-optical medium which is a domain wall displacement type magneto optical medium. In the magneto-optical disk 1, a magneto-optical layer 3 comprising plural layers and a protective layer 4 are formed on a transparent substrate 2. The magneto-optical disk 1 is rotatably supported on a spindle motor (not illustrated) by magnet chucking or the like. An optical head for recording and reproduction of information comprising plural optical devices is arranged under the lower surface of the magneto-optical disk 1, and a magnetic head 17 is arranged over the upper surface of the magneto-optical disk 1 in opposition to the optical head with interposition of the magneto-optical disk 1.

The optical head comprises a semiconductor laser 7, a collimator lens 8, a beam splitter 9, an objective lens 6, an actuator 5, a λ/2 plate 10, a polarized light beam splitter 11, condenser lenses 12 and photosensors 13 and is so constructed that it can be moved in a radial direction of the magneto-optical disk 1. Semiconductor laser 7 is driven by a semiconductor laser driver (hereinafter referred to as "LD driver" 15, and a light beam emitted from semiconductor laser 7 is made parallel by collimator lens 8 and then incident on beam splatter 9. This incident light flux passes through beam splitter 9, is focused by objective lens 6 and is projected as a minute light spot on magneto-optical disk 1.

The light spot struck on magneto-optical disk 1 is partially reflected on the surface of the magneto-optical disk, and the reflected light is projected on polarized light beam splitter 11 through objective lens 6, beam splitter 9 and λ/2 plate 10. The incident light flux is divided by polarized light beam splitter 11 into two portions according to polarized directions and respectively detected by photosensors 13 through condenser lenses 12. Output signals from the photosensors 13 are differentially detected in a differential amplifying circuit 14 and outputted as a magneto-optical reproduction signal.

A focus error signal and tracking error signal are generated by a control optical system and a servo error signal-detecting circuit (both not illustrated) on the basis of the reflected light from magneto-optical disk 1. In a servo control circuit (not illustrated), actuator (focusing and tracking actuator) 5 is driven on the basis of the focus error signal and tracking error signal to displace objective lens 6 in focusing and tracking directions, thereby conducting focusing control and tracking control in such a manner that the light spot irradiated from the optical head scans in focus on magneto-optical layer 3 of rotating magneto-optical disk 1 following up the intended track.

Magnetic head 17 is a recording head for applying a magnetic field modulated according to a recording signal to the light spot-irradiated site of magneto-optical disk 1 upon a recording operation. Magnetic head 17 is arranged in opposition to objective lens 6 of the optical head with interposition of magneto-optical disk 1. The light spot by the DC light of recording power is incident on magneto-optical disk 1 from the optical head during information recording, and at the same time, a recording magnetic field of which the polarity varies according to the recording signal is applied to the light spot-irradiated site from magnetic head 17 to conduct information recording of the so-called magnetic field modulation system. Magnetic head 17 is constructed so that it can be moved in the radial direction of magneto-optical disk 1, in interlocking movement with the optical head, to access the desired track of magneto-optical disk 1. Incidentally, the recording system is not limited to a magnetic field modulation type system; for example, a pulse-assisted magnetic field modulation type system, in which recording light is pulse irradiated, may also be used.

HPF (high-pass filter) 19 is a high frequency pass filter for removing a DC component generated by birefringence and imbalance of a magneto-optical reproduction signal, and an envelope-detecting circuit 20 is a circuit for detecting an envelope of the magneto-optical reproduction signal. Envelope-detecting circuit 20 comprises a peak-detecting circuit and a bottom-detecting circuit. A center-detecting circuit 21 is a circuit for detecting the central voltage of the envelope and detects the central voltage of amplitude of the reproduction signal by dividing peak detection voltage and bottom detection voltage equally. An A/D-converting circuit 22 serves to sample an output signal from center-detecting circuit 21 on the basis of a sampling-controlling signal (a signal for sampling timing) from a controller 16, digitize the sampled value and output the digital data into the controller 16. These HPF 19, envelope-detecting circuit 20, center-detecting circuit 21 and A/D-converting circuit 22 are used in a recording test for determining the optimum recording power of magneto-optical disk 1.

Controller 16 is a circuit for controlling the respective parts in the apparatus and conducts seek control of the optical head and magnetic head 17 on the basis of input information such as the rotational speed of magneto-optical disk 1, position of a recording radius, and recording sector information input during an ordinary recording-reproducing operation, and outputs reproducing power and recording power controlling signals to LD driver 15, and a recording signal to a magnetic head driver 18 so as to control the recording and reproducing operation of the information on and from magneto-optical disk 1. The controller 16 also conducts control of recording pattern and recording power in a test recording region, sampling control of A/D-converting circuit 22, sequence control of the test recording, operation and analysis of the results of the test recording, and so on, upon a test recording operation. The process of the test recording will be described in detail subsequently.

Figure 2A:
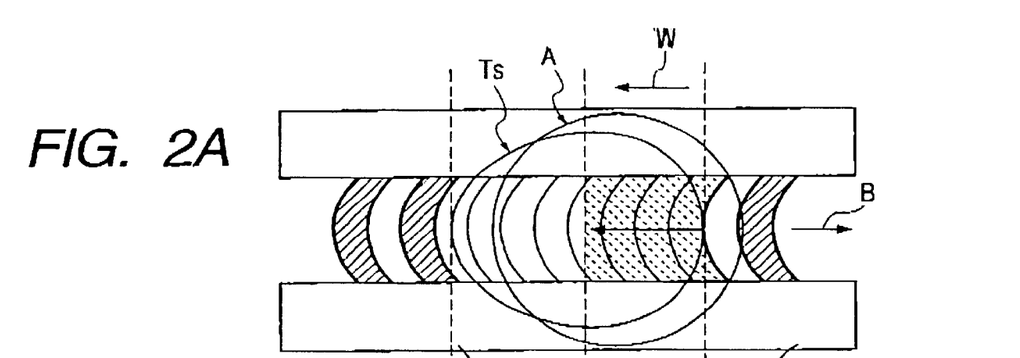
FIGS. 2A, 2B, 2C and 2D illustrate the principle of reproduction utilizing domain wall displacement.

Although a domain wall displacement type magneto-optical medium is used as the magneto-optical disk 1, the operation of domain wall displacement-reproduction in this magneto-optical medium will be described by reference to FIGS. 2A to 2D. Incidentally, a description is given in the case where the magneto-optical layer of magneto-optical disk 1 has a three-layer structure comprising a memory layer for storing recorded domains, a displacement layer in which domain walls are displaced to directly contribute to reproduction signals, and a switching layer for switching the coupling state between the memory layer and the displacement layer. FIG. 2A typically illustrates the magnetic domains on the magneto-optical medium, FIG. 2B the state of the magneto-optical layer, FIG. 2C a state diagram on the temperature of the magneto-optical medium, and FIG. 2D a waveform of a reproduction signal.

Figure 2B:
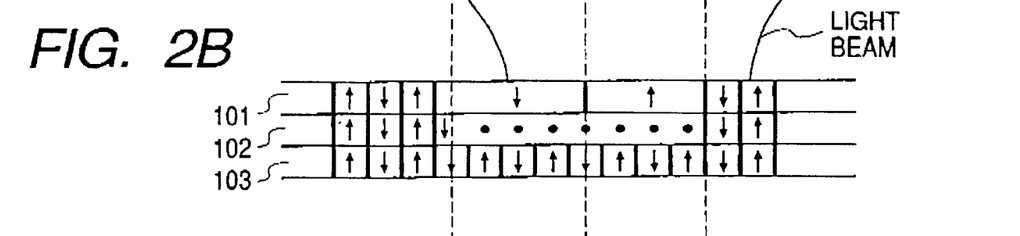
Figure 2C:
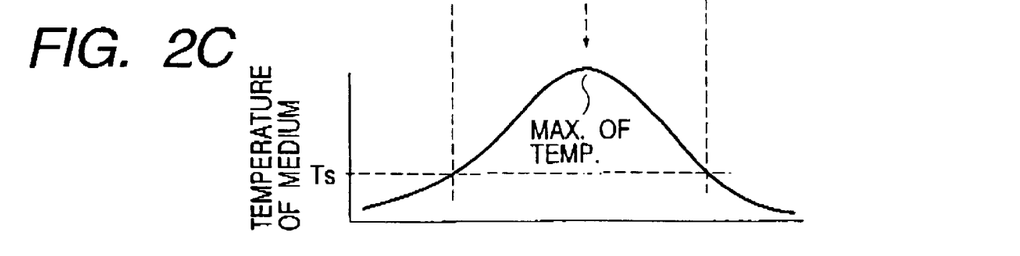

During reproduction of information, the displacement layer of the magneto-optical medium is heated by the irradiation of a light beam from an optical head, as illustrated in FIG. 2A, up to a temperature Ts at which a domain wall in the displacement layer is displaced. In FIG. 2A, circle A designates the light beam spot, and closed line Ts designates an isotherm of Ts. At this time, in a temperature region lower than the temperature Ts, the switching layer is in a state coupled with the memory layer and the displacement layer by exchange-coupling, as illustrated in FIG. 2B. When the magneto-optical medium is heated to the temperature Ts or higher by the irradiation of the light beam, the switching layer reaches its Curie temperature, so that the coupling between the displacement layer and the memory layer is broken. Therefore, at the same time a domain wall of a recorded domain reaches the border of the temperature Ts, a domain wall in the displacement layer is momentarily displaced to a position where the domain wall can remain energetically stable relative to the temperature gradient of the displacement layer, namely, to the maximum temperature point in the linear density direction of the temperature rise by the irradiation of the light beam in such a direction as indicated by arrow W in FIG. 2A along the major axis of the land (surface).

Figure 2D:
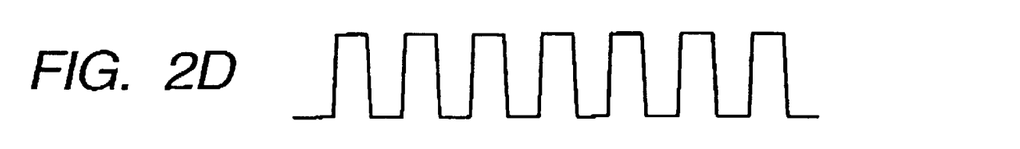

The border of the temperature Ts is present not only in front of the progressive direction of the light beam (arrow B in FIG. 2A), but also in back of the progressive direction of the light beam. Accordingly, domain wall displacement occurs at the same time as the transfer of a magnetic domain to the displacement layer at the border of the temperature Ts in back of the progressive direction of the light beam, and a reproduction signal is generated by this domain wall displacement phenomenon, like the displacement signal in front of the progressing direction of the light beam, so as to generate a reproduction signal in the form overlapped on the reproduction signal generated by the domain wall displacement phenomenon in front of the progressing direction of the light beam. However, at present this phenomenon has been improved by the improvement of medium to develop medium by which the domain wall displacement phenomenon from the back of the progressive direction of the light beam is prevented. Accordingly, a description is given herein on the premise that only domain wall displacement phenomenon from the front of the progressive direction of the light beam occurs. The magnetic domain pattern recorded in the memory layer illustrated in FIG. 2B becomes such a waveform of the reproduction signal as illustrated in FIG. 2D that faithfully reproduces the recorded domain pattern. The waveform of the reproduction signal is a magneto-optical signal detected by a change in deflecting direction by the steep domain wall displacement phenomenon of the displacement layer and thus becomes a reproduction signal of a rectangular form, unlike the conventional sinusoidal waveform.

A particular phenomenon upon cross writing of the domain wall displacement type magneto-optical medium will hereinafter be described. When a magnetic domain pattern is first recorded on an Nth track of the domain wall displacement type magneto-optical medium with prescribed recording power, and both (N−1)th track and (N+1)th track adjacent to the Nth track are erased with varied power while changing the power of a laser beam, the amplitude, edge jitter and pulse width of the reproduction signal of the magnetic domain pattern recorded on the Nth track show such changes as illustrated in FIG. 11 as against the erasing power of the (N−1)th track and (N+1)th track.

Here, a noticeable point is that the pulse width of the reproduction signal most quickly changes compared with the amplitude of the reproduction signal and jitter characteristics as against the erasing power of the (N−1)th track and (N+1)th track. More specifically, a recorded domain pattern in which the DC component is large, for example, a magnetic domain pattern in an erased state, is formed on the adjacent (N−1)th and (N+1)th tracks, whereby a change in the pulse width of the reproduction signal of the magnetic domain recorded on the Nth track manifests itself by the cross writing of magnetic domains recorded on the adjacent tracks. In this embodiment, a change in the pulse width characteristic of the domain wall displacement type magneto-optical medium, which is produced upon the occurrence of cross writing, is detected to detect recording power at which the cross writing occurs, thereby presetting the optimum recording power.

Figure 3A:
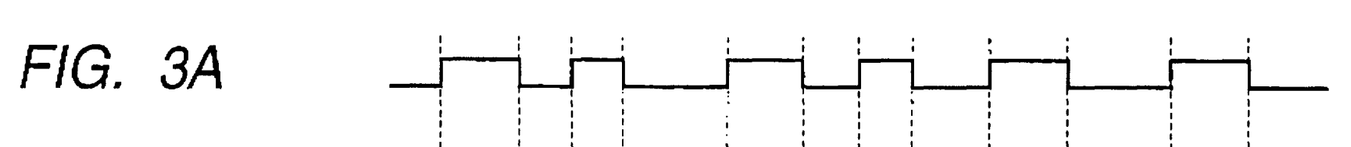
FIGS. 3A, 3B, 3C and 3D illustrate timing charts showing operation of information recording of the embodiment of FIG. 1.
Figure 3B:
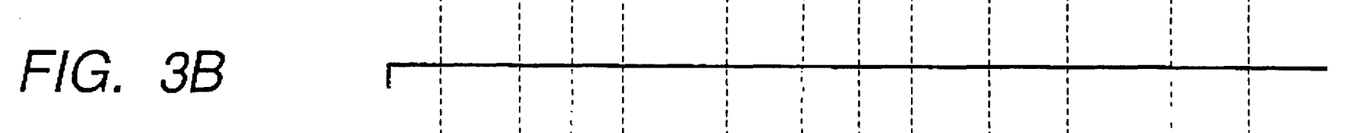
Figure 3C:
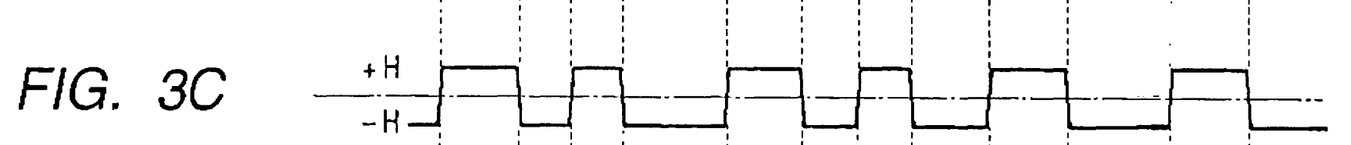
Figure 3D:
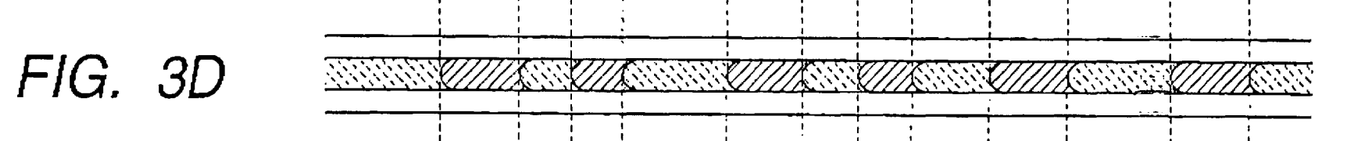

The basic recording operation in the domain wall displacement type magneto-optical medium will now be described with reference to FIGS. 3A to 3D. FIG. 3A illustrates a recording signal, FIG. 3B recording power, FIG. 3C a modulation magnetic field, and 3D a record mark sequence. When such a recording signal as illustrated in FIG. 3A is recorded, the controller 16 controls the LD driver 15 with the start of the recording operation to control the power of a light beam to the prescribed level as illustrated in FIG. 3B. The recording signal is sent to the magnetic head driver 18 to apply the modulation magnetic field illustrated in FIG. 3C from the magnetic head 17. By these operations, the record mark sequence illustrated in FIG. 3D is recorded on the medium in the course of cooling of the recording medium. In the record mark sequence illustrated in FIG. 3D, differently hatched portions indicate magnetic domains different in magnetizing direction from each other.

Figure 4:
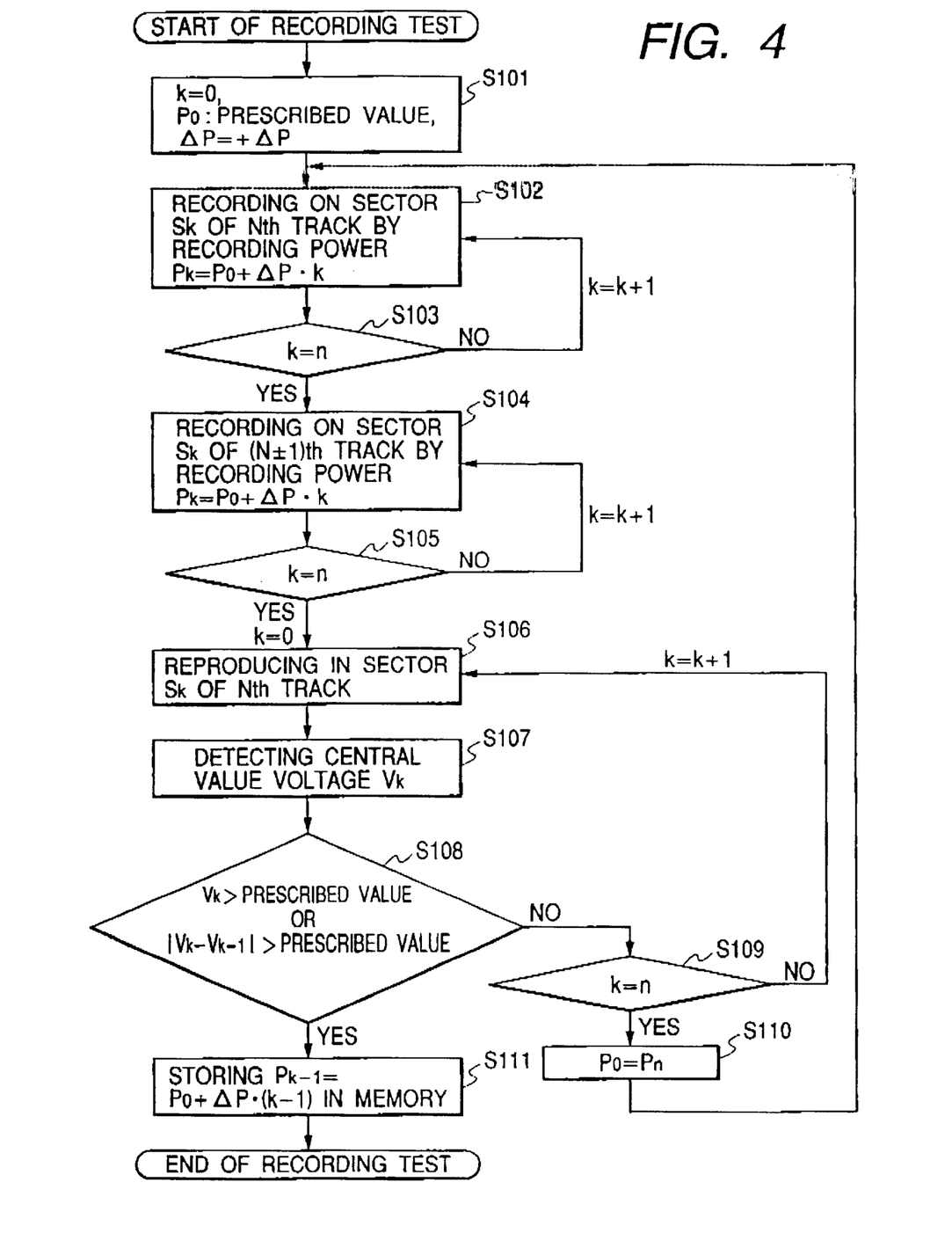
FIG. 4 is a flow chart illustrating a testing process for recording according to the embodiment of FIG. 1.

The testing process for magneto-optical recording for presetting the optimum recording power of the apparatus illustrated in FIG. 1 will now be described with reference to the flow chart illustrated in FIG. 4. In FIG. 4, the controller 16 presets a variable k to k=0, an initial value $P_0$ of recording power to a prescribed value, and a variation ΔP of the recording power to a prescribed value (S101). As the initial value P of the recording power, for example, the standard laser power $P_0$ standardized in the apparatus is used, $\Delta P$ is preset to $+\Delta P$ so as to increase the recording power $\Delta P$ by $\Delta P$. The controller 16 then controls the LD driver 15 and the magnetic head driver 18 to conduct recording in the predetermined testing region in accordance with such a recording process as described above (S102). As the testing regions, a region extending over a circuit is not always required. However, a region of at least 3 tracks is required. As the recording pattern, a pattern by which a duty variation by the fixed pulse width change of the reproduction signal more greatly manifests itself, namely, a pattern by which a great change manifests itself by the DC component of the reproduction signal is desirable. Accordingly, in this embodiment, for example, a repeated pattern of the shortest domain of a record mark is used as the record pattern recorded on the Nth track. A length of recording is determined to be, for example, one sector.

In this embodiment, the recording test regions $S_k$ (k=0,1, . . . , n) correspond to plural sectors $S_0$ through $S_n$. Signals are recorded in these sectors at S102 and S103 of FIG. 4 in the following manner. First, the record pattern is recorded on sector $S_k$ of the Nth track with the recording power $P_k = P_0 + \Delta P \cdot k$ in S102 of FIG. 4. Next, whether k is n (n being a natural number) or not is judged in S103. If k<n, then the recording is conducted again on the next sector $S_{k+1}$ of the Nth track with the recording power $P_{k+1} = P_0 + \Delta P \cdot (k+1)$ with the step returned to S102. At the first time of S102, the recording is conducted on the lead sector $S_0$ with the recording power $P_0$. Since k=0<n at this time, returning from S103 to S102 with setting k to k+1=0+1=1, a recording is newly conducted into sector S1 with the recording power $P_1 = P_0 + \Delta P \times 1$. Namely, the recording power is increased by $\Delta P$ to conduct the recording in the next sector $S_1$. Hereafter, the processings of S102 and S103 are repeated to conduct recording in order in sectors $S_2$, $S_3$. . . of the Nth track with the recording power increased $\Delta P$ by $\Delta P$, and the recording on the Nth track is completed when k is 0 in S103. By the above-described processing, the repeated pattern of the shortest domain is recorded in sectors $S_0$ to $S_n$ of the Nth track with the recording power increased $\Delta P$ by $\Delta P$. Incidentally, the recording power during recording on the Nth track may be a preset prescribed recording power.

When the recording on the Nth track is completed, similar recording is conducted on an (N−1)th track and an (N+1)th track adjacent to both sides of the Nth track. As the recording pattern, a pattern by which a change in the pulse width of the reproduction signal of the record pattern recorded on the Nth track manifests itself with the best result is desirable. Therefore, it is desirable to use an erase pattern in which no recorded domain is present. In this embodiment, the erase pattern in which no recorded domain is present is used as a pattern recorded on the (N+1)th tracks. When no DC magnetic field can be generated, for example, on the convenience of magnetic head driver 18, however, a pattern greater in DC component, for example, an alternate repeated pattern of the shortest mark and the longest mark is preferably used. Even when this pattern is used, cross writing can be detected by detecting a change in the pulse width of the reproduction signal. The intensity of a magnetic field of magnetic head 17 at the time the (N+1)th tracks are erased is preset to the same intensity as the intensity of a recording magnetic field, and the directions of magnetic fields applied are the same in the (N+1)th and (N−11)th tracks. When the polarities of the magnetic fields applied to the (N+1)th and (N−1)th tracks are reversed, changes in pulse width upon the occurrence of cross writing manifests itself with reversed polarities correspondingly.

When the (N±1)th tracks are erased, a lead sector $S_0$ in a recording regions $S_k$ (k=0,1, . . . , n) of any one track [for example, (N−1)th track] is erased with erasing power $P_k$ of ($P_0 + \Delta P \times k$) in S104. The erasing power is the same as the recording power in the case of the Nth track. Whether k is n (n being a natural number) or not is then judged in S105. Since k is 0 at this first time, k is preset to k+1 with the step returned to S104 to erase the next sector $S_1$. More specifically, the erasing power is increased by $\Delta P$ to conduct the erasing of the next sector $S_1$. Hereafter, the processings of S104 and S105 are repeated to conduct erasing in order in sectors S2, S3 . . . of the (N−1)th track with the erasing power increased $\Delta P$ by $\Delta P$, and the erasing of the (N−1)th track is completed when k is 0.

By the above-described processing, sectors $S_0$ to $S_n$ in the testing regions $S_k$ of the (N−1)th track are erased with the erasing power increased $\Delta P$ by $\Delta P$. When the erasing of the (N−1)th track is completed, the same erasing is conducted on the (N+1)th track. More specifically, a sector $S_0$ in the testing regions $S_k$ of the (N+1)th track is erased with erasing power of an initial value $P_0$. The next sector $S_1$ is then erased with the erasing power increased by $\Delta P$. Hereafter, the erasing of sectors S2 to $S_1$ is conducted in order with the erasing power increased $\Delta P$ by $\Delta P$. The sectors $S_0$ to $S_n$ of the Nth track and the (N+1)th tracks as the recording test regions are adjacent to one another, and the adjacent sectors $S_0$ to $S_n$ of the respective tracks are in a state in which recording or erasing has been conducted with the same power. Incidentally, the testing region of each track is less than 1track, and it is necessary to preset the n value taking this into consideration.

When the erasing is completed, controller 16 reproduces the Nth track to detect cross writing. More specifically, a light spot from the optical head is used as reproducing power, and the light spot of the reproducing power is scanned on the Nth track to conduct reproduction of test region $S_k$(k=0,1, . . . , n) of the Nth track (S106), thereby detecting a central value $V_k$ of the magneto-optical reproduction signal reproduced (S107). The detection of the central value is conducted in the following manner. A reproduction signal is reproduced from the reflected light on magneto-optical disk 1 in differential amplifying circuit 14 as described above, and the peak value and bottom value of this magneto-optical reproduction signal are detected in envelope-detecting circuit 20 after the DC component is removed through HPF 19. In center-detecting circuit 21, a central value between the peak value and bottom value is detected, and the detected value is sampled in A/D converting circuit 22 according to a sampling controlling signal from controller 16 and digitized to take the digital data in controller 16. The central value is detected at plural positions of a sector, and the respective data are taken in controller 16.

Figure 5A:
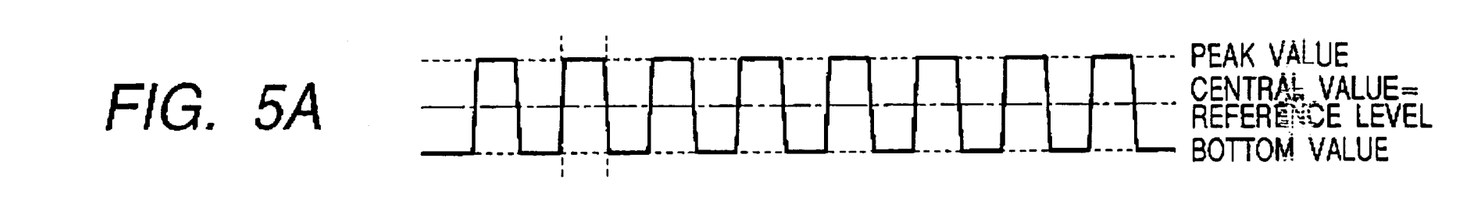
FIGS. 5A, 5B and 5C illustrate the principle of detecting cross writing according to the embodiment of FIG. 1.
Figure 5B:
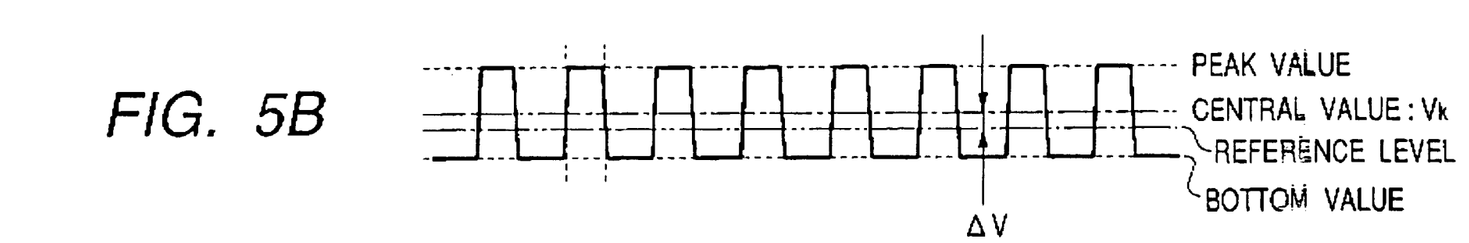
Figure 5C:
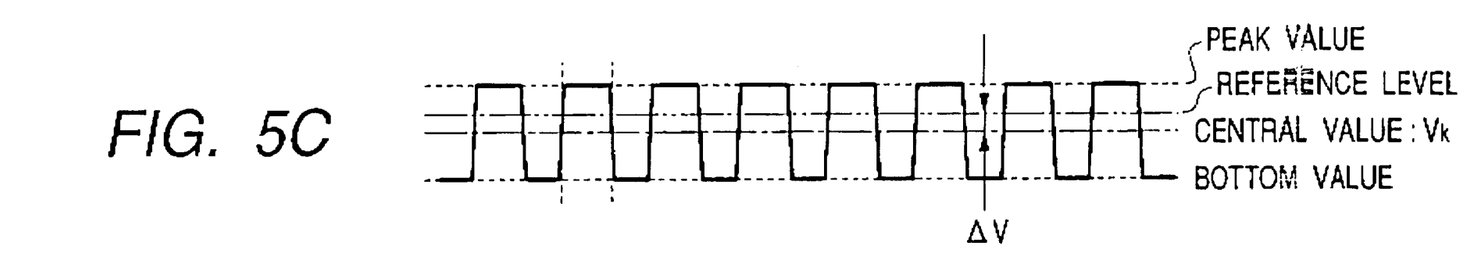

When the central value is detected, controller 16 averages the central values sampled plural times to store the average central value $V_k$ in a memory. Comparison of $V_k$> the prescribed value is conducted to judge whether cross writing occurs or not (S108). FIGS. 5A, 5B and 5C illustrate the principle of detecting cross writing. When the pulse width of the reproduction signal is a normal value without causing cross writing, the reproduction signal becomes a duty of 50%, as illustrated in FIG. 5A, and the central value $V_k$ is equal to a reference level (generally, GND level).

On the other hand, when the erasing power of the (N+1)th tracks adjacent to the Nth track is increased to cause cross writing, a change in the pulse width of the reproduction signal manifests itself by such a phenomenon characteristic of the domain wall displacement type magneto-optical medium, as described above, so as to cause a change in duty. FIG. 5B illustrates the waveform of a reproduction signal in the case where the cross writing occurs. As illustrated in FIG. 5B, the peak value and bottom value change to asymmetric levels as against the reference level, and the reference level and the central value show different values from each other. Accordingly, the duty of the reproduction signal, i.e. a change in the pulse width of the reproduction signal can be detected by detecting the absolute level $V_k$ of the central voltage of the reproduction signal of the Nth track as against the recording power of the (N+1)th tracks, and the cross writing can be detected by judging whether this detected value exceeds the prescribed value or not. Incidentally, FIG. 5C illustrates the waveform of the reproduction signal in the case where an erasing magnetic field reversed to the direction in FIG. 5B was applied to the (N+1)th tracks. In this case, the central value $V_k$ becomes a reversed polarity to the case of FIG. 5B, as against the reference level, and the phase of the pulse width is also in a reversed state. In this case as well, the cross writing can be detected.

The occurrence of cross writing is detected in S108 in such a manner, and whether k is n or not is judged in S109, if no cross writing occurs in sector $S_0$. Since k is 0 at this time, processing from S106 is conducted again. More specifically, the processings of S106 to S109 are repeated to detect the central voltage $V_k$ every sector, and the detected value is compared with the prescribed value, thereby detecting the occurrence of cross writing. Since the record pattern is recorded in the sectors $S_0$ to $S_n$ in the testing regions $S_k$ of the Nth track with the recording power varied $\Delta P$ by $\Delta P$, as described above, controller 16 compares $V_k$ with the prescribed value every sector and judges that when $V_k$ is greater than the prescribed value, cross writing occurs at that recording power. For example, when cross writing occurs in the reproduction signal of sector S3 (k=3), the recording power $P_k$ of ($P_0 + \Delta P \times 3$) at that time is detected as recording power at which the cross writing occurs, since the recording pattern is recorded in sector S3 with such recording power.

Incidentally, the occurrence of cross writing is detected in S108 by judging whether $V_k$ is greater than the prescribed value or not; however, the invention is not so limited. For example, even when no cross writing occurs, the duty of the reproduction signal may deviate due to some factors in some cases. In such a case, a change in the central value of the reproduction signal, as against the change of the recording power, is detected so as to find, for example, $\Delta V_k = |V_k - V_0|$ from a central value $V_0$ at the recording power $P_0$ of ($P_0 + \Delta P \times 0$) and a central value $V_k$ at the recording power $P_k$ of ($P_0 + \Delta P \times k$). When judging that cross writing has occurred at the time this value $\Delta V_k$ has exceeded the prescribed value, the deviation of duty in the initial state of the Nth track does not become a particular problem, whereby recording power at which cross writing occurs can be precisely detected.

Besides the above methods, the occurrence of cross writing may be detected by judging whether $|V_k$–average value of $\{V_0$ to $V_{k-1}\}|$ is greater than the prescribed value or not. More specifically, a difference between the central value $V_k$ in the current sector and an average value in sectors before that, and the difference is compared with the prescribed value, thereby detecting the occurrence of cross writing. According to this method, the occurrence of cross writing can be reliably detected even when a variation of the pulse width is small.

If the occurrence of cross writing is not detected in S108, the recording power is insufficient to cause cross writing. In this case, a step is allowed to progress to S109, to judge whether k is n or not. Since k is n at this time, the initial value $P_0$ of the recording power is preset to ($P_0 + \Delta P \times n$) in S110, so as to conduct the same processing again from S102. More specifically, the recording power is increased further by $\Delta P$ to conduct recording on the Nth track and erase the (N+1)th tracks. Thereafter, the Nth track is reproduced to detect the central value of the reproduction signal, and the central value thus obtained is compared with the prescribed value, thereby detecting the occurrence of cross writing.

When the occurrence of cross writing is detected in S108, recording power at which cross writing actually occurs is lower than the initial value $P_0$ of the recording power when the cross writing already occurs at the initial value $P_0$. Accordingly, in this case, the initial value of the recording power is preset to a value lower by n sectors ($\Delta P \times n$), i.e. $P_0 = (P_0 - \Delta P \times n)$, in S101, and the processings of S102 to S108 are conducted again. Record marks may also be erased while decreasing the recording power from the initial value $P_0$ every sector by $\Delta P$. However, in this case, the central value of the reproduction signal, as against the initial value $P_0$ of the recording power, is already affected by the cross writing. Therefore, it is preferable to determine $\Delta V_k = |V_k - V_{k-1}|$ from a central value $V_k$ in the current sector and a central value $V_{k-1}$ in the last sector, and to judge whether $\Delta V_k$ is greater than the prescribed value or not, thereby detecting the occurrence of cross writing where the occurrence of cross writing is detected in S108.

When the occurrence of cross writing is detected in S108, the optimum recording power is preset from the value of k (S111). More specifically, recording power of the upper limit at which no cross writing occurs, i.e. recording power $P_{k-1}$ of $\{P_0 + \Delta P \times (k-1)\}$ smaller than the recording power, at which the cross writing has occurred, by $\Delta P$ {however, $P_{k+1} = P_0 + \Delta P \times (k+1)$ when the recording power is decreased ($\Delta P < 0$)} is stored in the memory as the optimum recording power. A value obtained by multiplying a prescribed coefficient by the recording power of the upper limit at which no cross writing occurs may also be regarded as the optimum recording power. When the recording test is completed so as to record information in the magneto-optical disk 1, the information is recorded with the optimum recording power stored in the memory. Incidentally, the recording test illustrated in FIG. 4 is conducted, for example, at the time magneto-optical disk 1 has been inserted into the apparatus, at fixed time intervals during the insertion of the disk, every zone of the disk 1, or at the time a change in the temperature within the apparatus has exceeded a fixed value.

Figure 6:
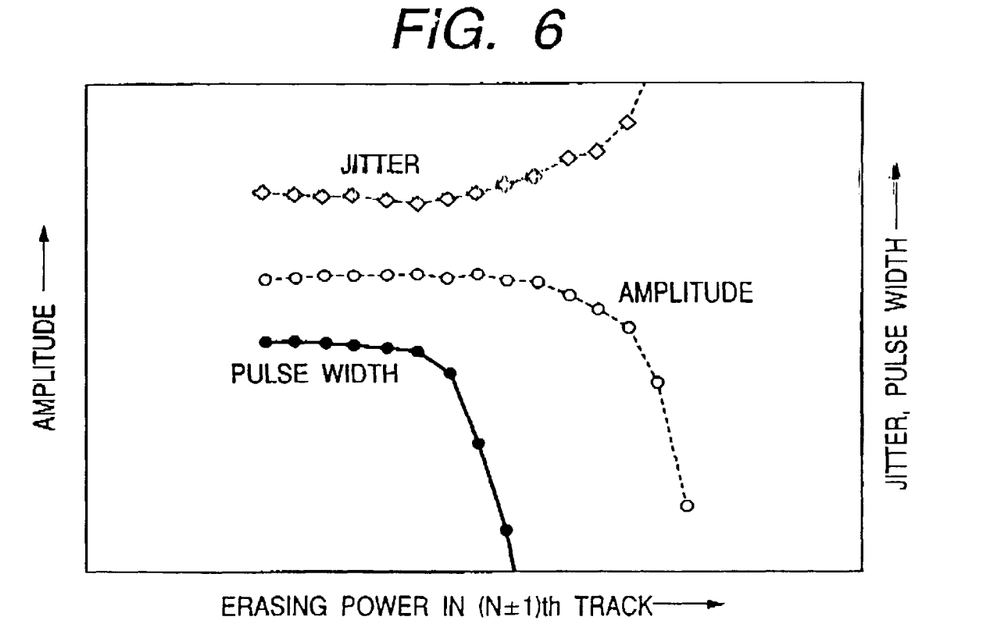
FIG. 6 illustrates the measured results of changes in the amplitude, edge jitter and pulse width of the reproduction signal of an Nth track as against changes in erasing power in the case where an erase pattern was recorded on (N±1)th tracks.

FIG. 6 illustrates the measured results of changes in the amplitude, edge jitter, and pulse width of the reproduction signal of an Nth track, as against changes in erasing power in (N+1)th tracks. As apparent from FIG. 6, the pulse width of the reproduction signal most quickly changes compared with the amplitude and edge jitter of the reproduction signal, and substantially remains constant without changing until cross writing occurs. In the case where a recording system is a magnetic field modulation system, as described above, the recording power of the Nth track can be changed in a manner similar to the recording power of the adjacent tracks, since the pulse width of the reproduction signal is kept at a fixed value irrespective of recording power though the recording light beam is DC light or pulse light. Therefore, even when values (such conditions that the duty of a reproduction signal is preset to 50%) of recording power under conditions excluding cross writing are not determined, the recording test can be practiced on cross writing, and the optimum recording power can be preset in view of the upper limit of recording power at which cross writing occurs.

Figure 7:
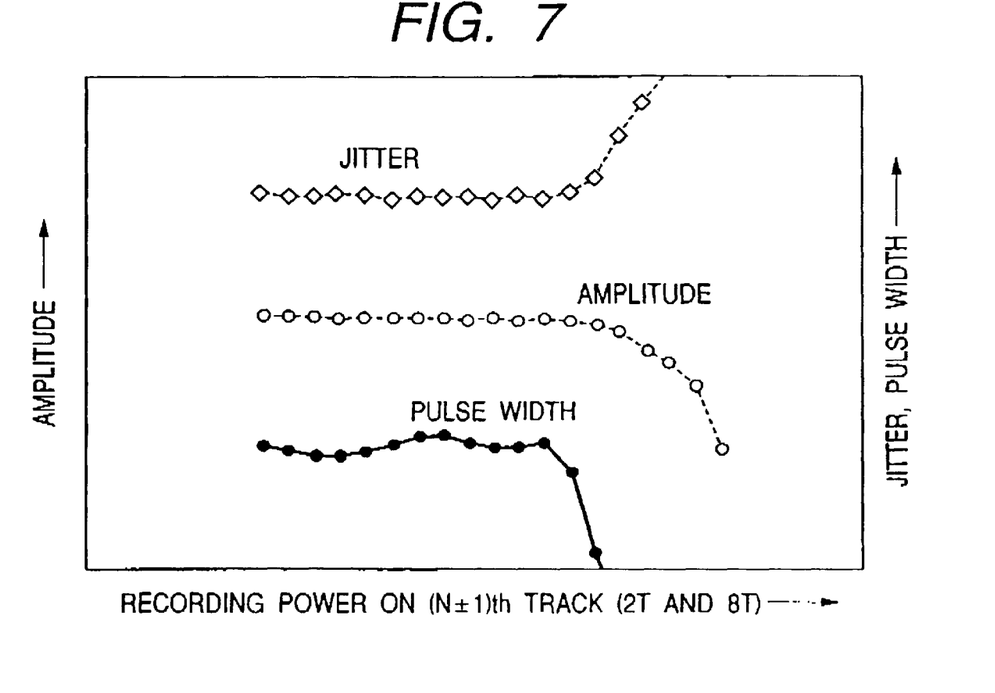
FIG. 7 illustrates the measured results of changes in the amplitude, edge jitter and pulse width of the reproduction signal of an Nth track as against changes in recording power in the case where an alternate repeated pattern of the shortest mark and the longest mark was recorded on (N±1)th tracks.

FIG. 7 illustrates the measured results of changes in the amplitude, edge jitter and pulse width of the reproduction signal of an Nth track, as against changes in recording power, in the case where an alternate repeated pattern of the shortest mark and the longest mark (a repeated pattern of 2T and 8T) was recorded on (N+1)th tracks.

In this case as well, a change in the pulse width most quickly manifests itself as against the occurrence of cross writing, and so cross writing can be detected by detecting the change in the pulse width even when the repeated pattern of the shortest mark and the longest mark is used.

Figure 8:
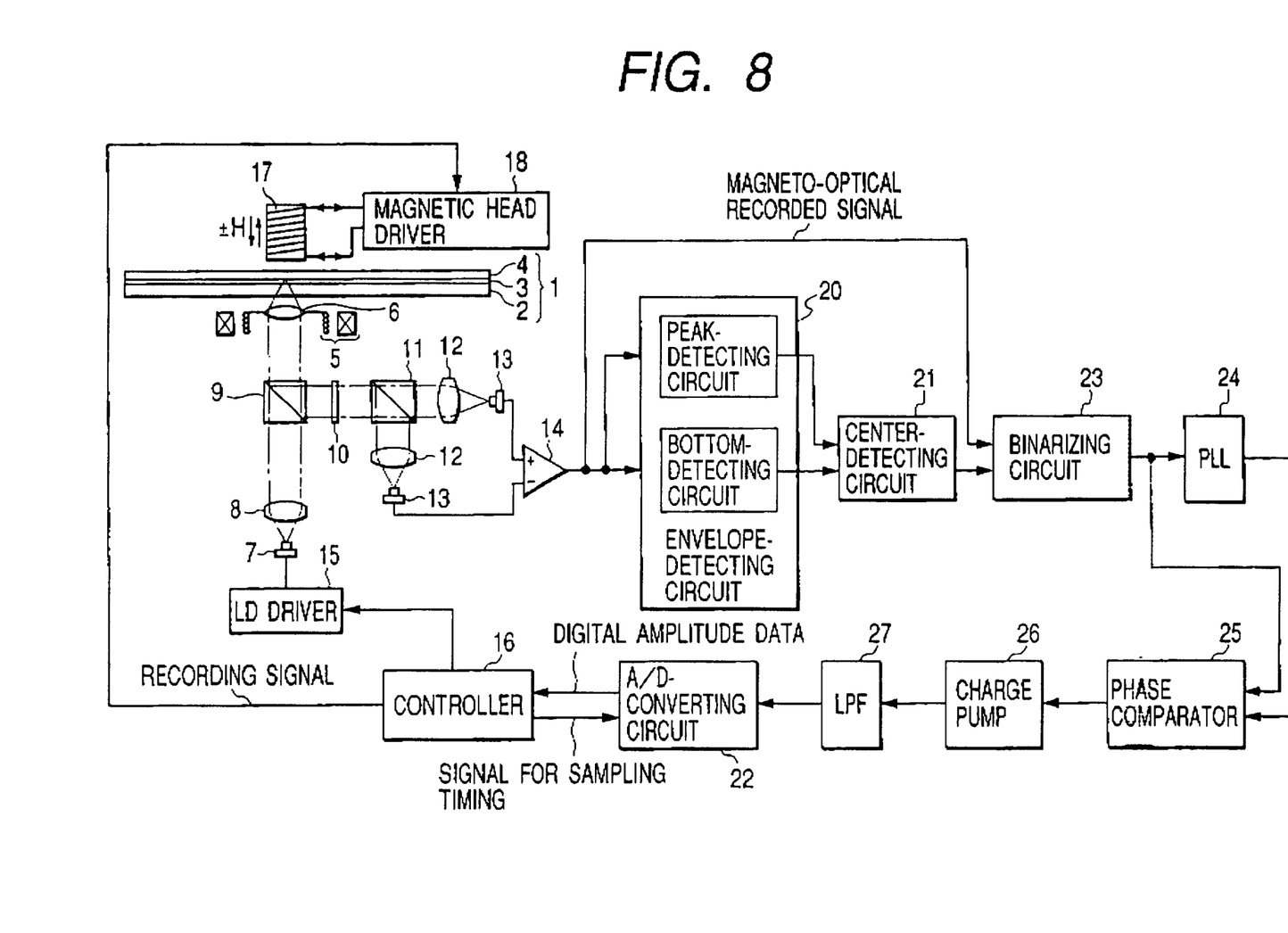
FIG. 8 is a block diagram illustrating a magneto-optical recording-reproducing apparatus according to a second embodiment of the present invention.

FIG. 8 is a block diagram illustrating the construction according to a second embodiment of the present invention. In FIG. 8, like reference characters are given to the same parts as in FIG. 1, and their description is omitted. In the first embodiment, the central value between the peak value and bottom value of the reproduction signal is detected, and this value is compared with the prescribed value, thereby detecting the change in the pulse width of the reproduction signal, so as to detect the occurrence of cross writing. In this embodiment, on the other hand, output voltage from a charge pump used in signal processing of a reproduction signal is detected, and this value is compared with the prescribed value, thereby detecting the occurrence of cross writing. In FIG. 8, a magneto-optical reproduction signal output from differential amplifying circuit 14 is input into envelope-detecting circuit 20 and a binarizing circuit 23. Envelope-detecting circuit 20 serves to remove the influence of DC variation by imbalance of the magneto-optical reproduction signal due to birefringence and the like so as to always binarize the magneto-optical reproduction signal at the central value of amplitude. In envelope-detecting circuit 20, the peak value and bottom value of the reproduction signal are detected, and a central value thereof is detected in center-detecting circuit 21.

In binarizing circuit 23, the magneto-optical reproduction signal is binarized by using the central value obtained as a threshold value, and a synchronous clock is produced from the binarized reproduction signal in a PLL circuit 24. In this case, PLL circuit 24 takes phase synchronization into any one edge of the leading edge and trailing edge of the binarized reproduction signal, and the synchronous clock is generated at a duty of 50%. A phase comparator 25 compares the phases of the synchronous clock and the binarized reproduction signal with each other so as to output a signal indicating a phase difference. In this embodiment, the phase of a reversed edge of an edge in which PLL has been locked is compared with the phase of the synchronous clock. A charge pump 26 converts the output from phase comparator 25 into voltage and outputs it through LPF (low-pass filter) 27. The output from LPF 27 value is sampled in A/D-converting circuit 22 according to a sampling-controlling signal from controller 16 and digitized so as to take the digital data in controller 16. The other constitutions are the same as in FIG. 1.

Figure 9:
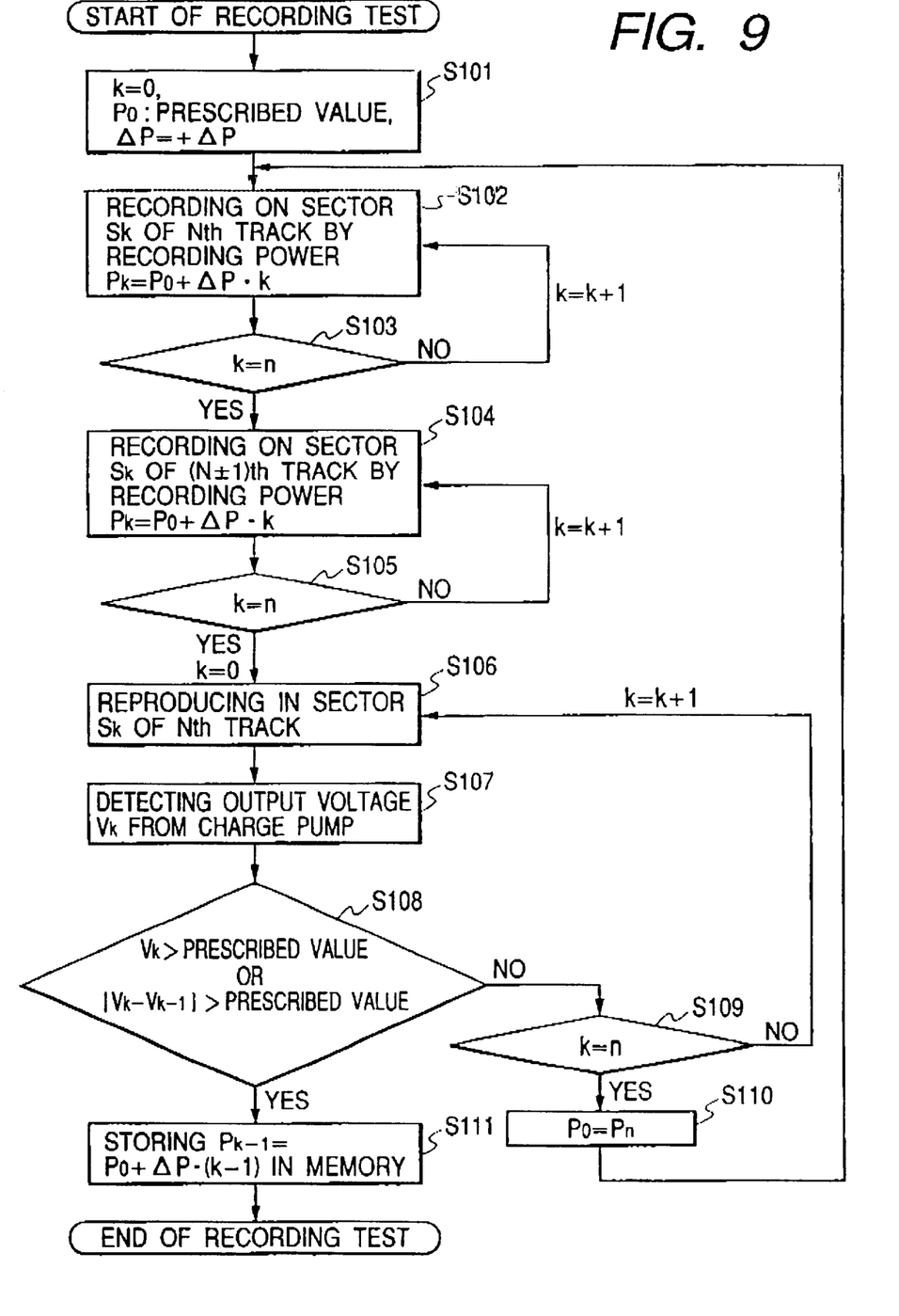
FIG. 9 is a flow chart illustrating a testing process for recording according to the embodiment of FIG. 8.

The testing process for recording of the apparatus illustrated in FIG. 8 will now be described with reference to the flow chart illustrated in FIG. 9. The testing process for recording illustrated in FIG. 9 is exactly the same as in FIG. 4 except for S107. The same processings are described briefly. In FIG. 9, the presetting of k=0, the initial value $P_0$ of recording power and $\Delta P=+\Delta P$ is first conducted in S101, and in S102 and S103, a record pattern is recorded in sectors $S_0$ to $S_n$ of an Nth track as testing regions $S_k$ in order with the recording power increased every sector $\Delta P$ by $\Delta P$. As the record pattern, a repeated pattern of the shortest mark is used likewise. In S104 and S105, recording is then conducted in sectors $S_0$ to $S_n$ of (N±1)th tracks adjacent to the Nth track with the recording power increased every sector $\Delta P$ by $\Delta P$. As the record pattern, either an erase pattern or an alternate repeated pattern of the shortest mark and the longest mark may be used. The recording power in the Nth track may be constant.

When the recording is completed, the processings of S106 to S109 are conducted repeatedly to reproduce test region $S_k$ of the Nth track, detect output voltage $V_k$ from charge pump 26 and compare this value with the prescribed value, thereby detecting the occurrence of cross writing every sector. In this case, the output voltage $V_k$ from charge pump 26 is taken in A/D-converting circuit 22 according to a sampling-controlling signal from controller 18. The value is taken in plural times in each of sectors $S_0$, as in the testing regions of the Nth track, and averaged every sector in controller 16 so as to calculate an average output voltage $V_k$ from charge pump 26 in each of sectors $S_0$ to $S_n$. Controller 16 compares the output voltage $V_k$ from charge pump 26 with the prescribed value every sector to detect recording power at which cross writing occurs, which is detected on the basis of the compared results.

Figure 10A:
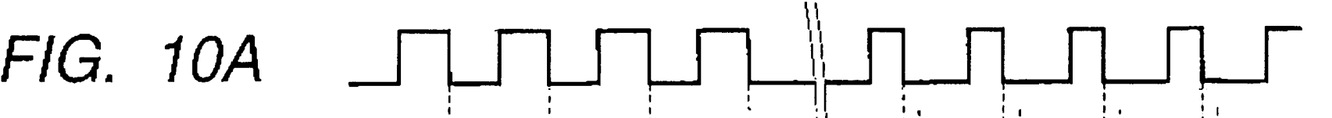
FIGS. 10A, 10B, 10C and 10D illustrate signals from the respective parts of FIG. 8 in the case where no cross writing occurs, compared with the case where cross writing occurs.
Figure 10B:
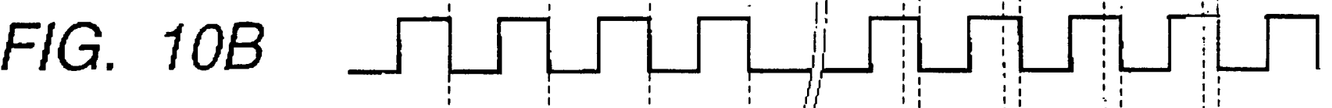
Figure 10C:
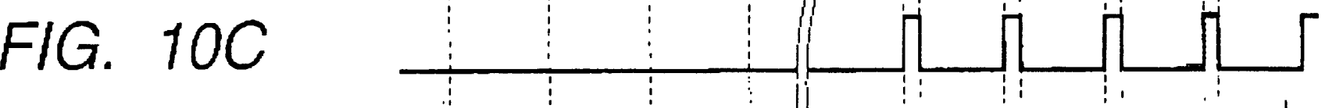
Figure 10D:
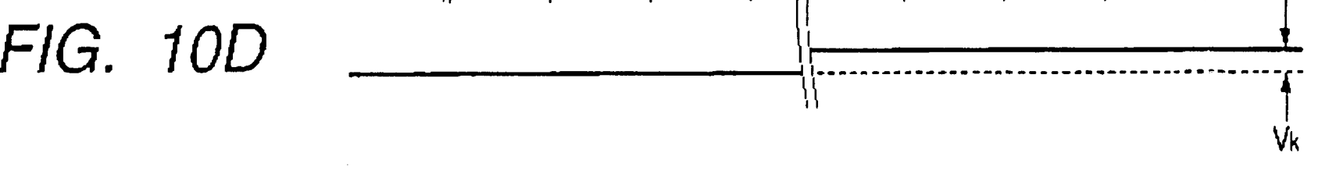

FIGS. 10A to 10D illustrate signals from the respective parts of the apparatus illustrated in FIG. 8 with the case where cross writing occurs compared with the case where no cross writing occurs. FIG. 10A shows a binarized reproduction signal from binarizing circuit 23, FIG. 10B a synchronous clock from PLL circuit 24, FIG. 10C a phase difference signal from phase comparator 25, and FIG. 10D an output signal from charge pump 26. Such a change in the pulse width of the reproduction signal as described above does not manifest itself in a state in which no cross writing occurs, as shown in the left side of the figures, and the duty of the binarized reproduction signal is 50%, as illustrated in FIG. 10A. When PLL is applied at the leading edge of this signal to make the duty of the synchronous clock 50%, such a synchronous clock as illustrated in FIG. 10B is provided. When the phases of the binarized reproduction signal and the synchronous clock are compared with each other by phase comparator 25, no phase shift occurs, and no phase difference signal is output from phase comparator 25, as illustrated in FIG. 10C. Accordingly, in this case, the output from charge pump 26 does not change, as illustrated in FIG. 10D, and becomes 0 level.

When cross writing occurs, as shown in the right side of FIGS. 10A to 10D, a change in the pulse width of the reproduction signal manifests itself, and the pulse width of the binarized reproduction signal changes, as illustrated in FIG. 10A, to obtain a binarized reproduction signal the duty of which deviates from 50%. When PLL is applied at the leading edge of this signal to make the duty of the synchronous clock 50%, a synchronous clock such as illustrated in FIG. 10B is output. When the phases of the synchronous clock 1 and the binarized reproduction signal are compared with each other, a pulse signal according to the phase difference is output, as illustrated in FIG. 10C. When this signal is pulse width-voltage converted by charge pump 26, a voltage signal according to the phase difference is provided, as illustrated in FIG. 10D.

The output voltage value $V_k$ from charge pump 26 extremely corresponds to the pulse width of the binarized reproduction signal, and so a change in the pulse width of the reproduction signal can be detected by detecting the voltage value $V_k$. The edge to which PLL is applied is not limited to the leading edge, and a trailing edge may also be permissible. The reason why PLL is applied to one edge is that no periodic change occurs even when a change in the pulse width is caused so far as PLL is applied to one edge, i.e. period, so that increase in control error of PLL can be avoided. In addition, a polarity for phase shift is required in an ordinary PLL circuit for producing a synchronous clock. However, the polarity becomes no problem herein, and only the quantity of phase shift is important.

The occurrence of cross writing is detected in accordance with such a principle in S108 to judge that the cross writing has occurred when the output voltage value $V_k$ from charge pump 26 is greater than the prescribed value. In this case, the absolute value of the voltage value $V_k$ from charge pump 26 or a variation $\Delta V_k$ of the absolute value $V_k$ as against each recording power are calculated so as to judge that the cross writing has occurred when these values exceed the respective prescribed values. Controller 16 judges whether cross writing occurs or not in each of sectors $S_0$ to $S_n$ of the Nth track. If no cross writing occurs, the initial value $P_0$ of the recording power is preset to $(P_0+\Delta P \times n)$ likewise to conduct the processing again from S102.

When the occurrence of cross writing is detected S108, the initial value of recording power is lowered likewise by a fixed quantity when the cross writing already occurs at the initial value $P_0$ of the recording power, and the processings from S102 are conducted again at recording power $P_0=(P_0-\Delta P \times n)$. Recording may also be conducted again from S102 while decreasing the recording power $\Delta P$ by $\Delta P$. However, when the occurrence of cross writing is detected in S108 in this case, the voltage value from charge pump 26 as against the initial value $P_0$ of the recording power is already affected by the cross writing. Therefore, whether cross writing occurs or not is judged by comparing $\Delta V_k=|V_k-V_{k-1}|$ with the prescribed value.

When the occurrence of cross writing is detected at recording power higher than the initial value of the recording power in S108, the optimum recording power is preset on the basis of the value of k of the recording power at which the cross writing occurs. More specifically, recording power of the upper limit at which no cross writing occurs, i.e. recording power $P_{k-1}$ of $[P_0+\Delta P \times (k-1)]$ [however, $P_{k+1}=P_0-\Delta P \times (k+1)$ when the recording power is decreased ($\Delta P<0$)] is stored in the memory as the optimum recording power. information is recorded, the optimum recording power is read out of the memory, and LD driver 15 is controlled according to this value, thereby setting recording power. A value obtained by multiplying a prescribed coefficient by the recording power of the upper limit at which no cross writing occurs may also be regarded as the optimum recording power. In the above-described embodiments, a signal value according to the pulse width of the reproduction signal is detected by detecting the central value between the peak value and bottom value of the reproduction signal, or the output from the charge pump. However, the pulse width of the reproduction signal may also be directly detected. For example, the pulse widths (both positive side and negative side) of the binarized reproduction signal from binarizing circuit 23 in FIG. 8 are measured by using any necessary measuring means to judge that cross writing occurs when a difference between both pulse widths changes.

As described above, according to the present invention, recording power at which cross writing occurs is detected on the basis of a change in the pulse width of a reproduction signal, and the optimum recording power is preset according to this recording power. Therefore, the occurrence of cross writing can be most exactly detected even when a track pitch in domain wall displacement type magneto-optical medium is with the requirement of the high-density recording, and the optimum recording power can be precisely preset. Accordingly, error erase of adjacent tracks can be prevented, and the influence by scattering among apparatus can be minimized, so that the testing process and apparatus for recording can be realized with high reliability.

What is claimed is:

1. A method for test recording and presetting optimum recording power for a domain wall displacement type magneto-optical medium, the method comprising the steps of:

recording a first test record pattern on an Nth track on the magneto-optical medium;

separately recording a second test record pattern on an (N−1)th track and an (N+1)th track adjacent to both sides of the Nth track with varied recording power;

reproducing a signal on the Nth track and detecting a change in the pulse width of a reproduction signal while reproducing the signal on the Nth track;

determining a recording power at which cross writing occurs on the Nth track, on the basis of the detected result in said signal reproducing and pulse width change detecting step; and presetting the optimum recording power on the basis of the recording power at which cross writing occurs, as determined in the recording power determining step.

2. The test recording and presetting method according to claim 1, wherein the first test record pattern is a repeated pattern of the shortest domain of a record mark.

3. The test recording and presetting method according to claim 1, wherein the second test record pattern is an alternating, repeating pattern of the shortest domain and the longest domain of a record mark.

4. The test recording and presetting method according to claim 1, wherein the second test record pattern is an erase pattern in which no recorded domain is present.

5. The test recording and presetting method according to claim 1, wherein the recording of information is conducted by applying a magnetic field modulated according to the recording information to the magneto-optical medium while DC-irradiating or pulse-irradiating the magneto-optical medium with a light beam.

6. The test recording and presetting method according to claim 1, wherein recording is conducted on the Nth track and the (N±1)th tracks with the same varied recording power.

7. The test recording and presetting method according to claim 1, wherein the change in the pulse width is detected by detecting a central value between a peak value and a bottom value of the reproduction signal after passing through a high-pass filter, and comparing the central value with a standard value.

8. The test recording and presetting method according to claim 1, wherein the change in the pulse width is detected by detecting a phase difference between a synchronous lock synchronized with the reproduction signal and a binarized reproduction signal by a phase comparator, binarized reproduction signal by a phase comparator, and comparing a signal obtained by converting the detected phase difference to a voltage signal by a charge pump with a standard value.

9. A magneto-optical recording-reproducing apparatus for recording information on a domain wall displacement type magneto-optical medium, the apparatus comprising:

a light source that emits a light beam;

a recording circuit that records a first test record pattern on an Nth track on the medium and separately records a second test record pattern on an (N−1)th track and an (N+1)th track adjacent to both sides of the Nth track with varied recording power while controlling the light source;

a reproduction circuit that detects the first test record pattern by means of the light beam so as to output a reproduction signal;

a pulse width change detection circuit that detects a change in the pulse width of the reproduction signal; and a recording power determination circuit that determines a recording power at which cross writing occurs, on the basis of the detected result of said pulse width change detection circuit, and presets an optimum recording power of the recording circuit on the basis of the recording power determined by said recording power determination circuit.

* * * * *

UNITED STATES PATENT AND TRADEMARK OFFICE
CERTIFICATE OF CORRECTION

PATENT NO. : 6,646,968 B1
DATED : November 11, 2003
INVENTOR(S) : Yasuyuki Miyaoka It is certified that error appears in the above-identified patent and that said Letters Patent is hereby corrected as shown below:

<u>Column 1,</u>
Lines 37 and 44, "land & groove" should read -- land and groove --.

<u>Column 8,</u>
Line 5, "laver" should read -- layer --.

Signed and Sealed this

Third Day of February, 2004

JON W. DUDAS
*Acting Director of the United States Patent and Trademark Office*